United States Patent [19]

Rosenbaum et al.

[11] Patent Number: 4,514,595
[45] Date of Patent: Apr. 30, 1985

[54] ACTIVE IMPEDANCE LINE FEED CIRCUIT

[75] Inventors: Stanley D. Rosenbaum, Ottawa; Martin R. Handforth, Kanata, both of Canada

[73] Assignee: Northern Telecom Limited, Montreal, Canada

[21] Appl. No.: 386,871

[22] Filed: Jun. 10, 1982

[51] Int. Cl.³ .................. H04M 1/74; H04M 1/76; H04M 19/00
[52] U.S. Cl. ............... 179/16 F; 179/16 AA; 179/18 FA; 179/70; 179/170 NC
[58] Field of Search ....... 179/70, 77, 170 D, 170 NC, 179/16 F, 18 FA, 16 AA

[56] References Cited

U.S. PATENT DOCUMENTS

| 3,748,395 | 7/1973 | Herter | 179/18 FA |
|---|---|---|---|
| 4,319,093 | 3/1982 | Bars | 170/170 D |
| 4,331,842 | 5/1982 | Kiko | 179/170 NC |
| 4,387,273 | 6/1983 | Chea, Jr. | 179/18 FA |
| 4,388,500 | 6/1983 | Regan | 179/170 NC |
| 4,431,868 | 2/1984 | Bolus et al. | 179/18 FA |
| 4,476,350 | 10/1984 | Aull et al. | 179/70 |
| 4,484,032 | 11/1984 | Rosenbaum | 179/18 FA |
| 4,485,277 | 11/1984 | Minch et al. | 179/170 NC |

FOREIGN PATENT DOCUMENTS 79565 6/1981 Japan ................. 179/16 F

OTHER PUBLICATIONS

"Balanced Electronic Hybrid Circuits", D. E. Fisk et al., IBM Technical Disclosure Bulletin, Jul. 1973, vol. 16, No. 2, pp. 495-496.
"A High-Voltage for a Transformerless Trunk and Subscriber Line Interface", by D. W. Aull et al., IEEE Journal of Solid-State Circuits, vol. SC-16, No. 4, Aug. 1981, pp. 261-266.

Primary Examiner—Gene Z. Rubinson
Assistant Examiner—R. Vaas
Attorney, Agent, or Firm—J. E. Moorhouse

[57] ABSTRACT

A line circuit includes tip and ring voltage amplifiers each having an output resistively connected via tip and ring feed resistors to tip and ring leads in a telephone line. The tip and ring feed resistors have closely matched ohmic values, and are part of a resistance network which also includes first and second voltage dividers. The first voltage divider is connected in series between the output of the tip voltage amplifier and an end of the ring feed resistor remote from the output of the ring voltage amplifier, and includes a first voltage tap. The second voltage divider is connected in series between the output of the ring voltage amplifier and an end of the tip feed resistor remote from the output of the tip voltage amplifier, and includes a second voltage tap. A control circuit includes a differential input connected across the first and second voltage taps. In operation the control circuit causes the tip and ring voltage amplifiers to provide energizing direct current for the telephone line. Tip and ring feedback networks, connected across the respective tip and ring feed resistors, provide feedback signals to the tip and ring voltage amplifiers such that in operation common mode rejection of longitudinally induced a.c. signals on the telephone line is enhanced.

7 Claims, 4 Drawing Figures

ACTIVE IMPEDANCE LINE FEED CIRCUIT

The invention relates to interface circuits for communication lines and particularly to a line circuit for supplying energizing current and a.c. signals to a pair of leads in a communication line.

In telephony, a subscriber loop is typically provided by a communication line having a pair of leads for connecting a remote station set to the telephone network. The communication line is terminated at a line circuit which has traditionally included a transformer having windings for coupling a.c. signals between the communication line and a port associated with a telephone switching facility in the telephone network. One of the windings in the transformer, often a split winding, is connected to the pair of leads and usually provides a d.c. path for supplying energizing current to the communication line. Supervisory circuitry usually associated with the line circuit is responsive to variations in the flow of energizing current to indicate ON HOOK and OFF HOOK conditions at the station set, and to detect dial pulses transmitted by the station set. As the transformer tends to be the most expensive element in a line circuit, it has been a long standing objective of telephony circuit designers to either reduce the size of the transformer or eliminate it altogether.

Numerous designs of transformerless line circuits have been published. Most of these designs either fall short of providing a workable interface for all subscriber line situations or alternately are exceedingly difficult and expensive to manufacture. However many of these designs are practical for average and short length loop applications particularly in relation to private branch exchange situations in which loop circuits are characteristically shorter and less exposed to the natural elements than in the typical central office situation.

A line circuit in accordance with the invention is provided by dynamically controllable tip and ring voltage amplifiers for supplying energizing current to a two wire transmission line. A resistance network includes tip and ring feed resistors each connected in series between respective outputs of the tip and ring voltage amplifiers and respective tip and ring terminals. The resistance network also includes tip and ring voltage dividers with tip and ring voltage taps being connected to inputs of a control circuit. The control circuit is differentially responsive to potentials appearing at the voltage taps during an OFF HOOK condition to cause the voltage sources to conduct currents via the resistance network and the two wire transmission line such that a substantially predetermined average voltage appears across the voltage taps.

The control circuit is connected via differential inputs to the voltage taps to provide common mode rejection of a.c. signals which may be induced along the length of the two wire transmission line. In order to obtain a significant degree of common mode rejection, the ohmic values of the tip and ring feed resistances are closely matched. For example a tolerance of 0.1% is preferred for private branch exchange uses, and a more exact tolerance of 0.05% is preferred in cases where extreme longitudinal a.c. signals may be encountered, such as in uses with central office exchanges. Also resistance values in respective arms of the tip and ring voltage dividers are preferably matched to within 0.1%.

In one example of the invention common mode rejection of longitudinal a.c. signals on the transmission line is improved by including tip and ring feedback networks bridging the respective tip and ring feed resistors. The feedback networks include arms of matched resistance values, preferably within 1.0%. Voltage taps of the respective feedback networks are connected to inputs of the respective tip and ring voltage amplifiers. This improvement has the effect of reducing a common mode rejection performance requirement of the control circuit to that very easily obtainable from currently available differential amplifiers.

Example embodiments are described in the following with reference to the accompanying drawings in which.

Figure 1:
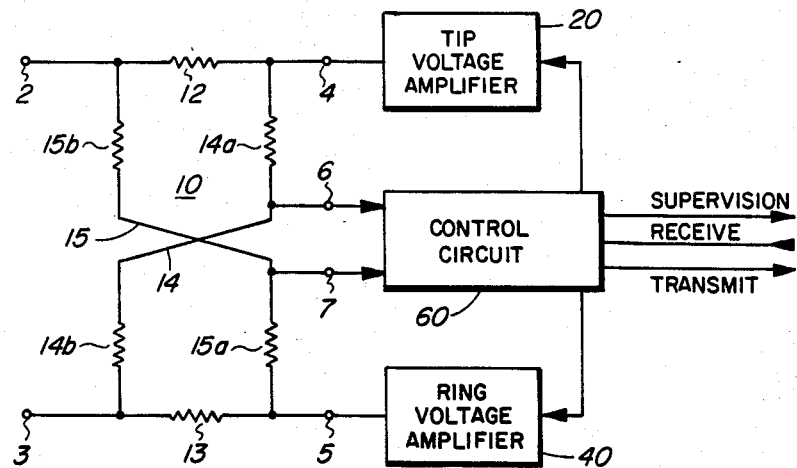
FIG. 1 is a schematic and block illustration of a line circuit in accordance with the invention.

Referring to FIG. 1, the line circuit includes a tip voltage amplifier 20, a ring voltage amplifier 40, a control circuit 60 and a resistance network 10. The control circuit 60 includes supervision, receive and transmit leads for communicating with a communication facility, not shown. The resistance network 10 is connected to tip and ring terminals 2 and 3 being provided for connection to a two wire transmission line which is used to couple a remote telephone set or the like, not shown, to the line circuit. The resistance network 10 includes tip and ring feed terminals 4 and 5 connected to outputs of the tip and ring voltage amplifiers 20 and 40, and tip and ring voltage taps 6 and 7 connected to inputs of the control circuit 60. A tip feed resistor 12 is connected in series between the tip terminal 2 and the tip feed terminal 4. A ring feed resistor 13 is connected in series between the ring terminal 3 and the ring feed terminal 5. The resistors 12 and 13 are closely matched and each has an ohmic value of usually not more than one quarter of the lowest d.c. feed resistance required for a range of transmission line characteristics. A tip voltage divider 14 includes resistors 14a and 14b connected in series between a feed side of the tip feed resistor 12 adjacent the tip feed terminal 4, and a line side of the ring feed resistor 13 adjacent the ring terminal 3. The voltage tap 6 is defined by a junction of the resistors 14a and 14b. A ring voltage divider 15 includes resistors 15a and 15b connected in series between a feed side of the ring feed resistor 13 adjacent the ring feed terminal 5, and a line side of the tip feed resistor 12 adjacent the tip terminal 2. The ring voltage tap 7 is defined by a junction of the resistors 15a and 15b. The values of the resistors in the tip and ring voltage dividers 14 and 15 are closely matched in a range of about 1,000 to 10,000 times greater than the values of the feed resistors 12 and 13, but are not necessarily limited to this range. In the example embodiment described the feed resistors are closely matched at about 100 ohms and the voltage divider resistors are all closely matched at about 330K ohms.

In operation, the telephone set being in an OFF HOOK condition, a current path is completed between the tip and ring terminals 2 and 3. An energizing direct current flows between the outputs of the voltage amplifiers 20 and 40, via the current path. The control circuit 60 responds to voltages being developed across the feed resistors 12 and 13 and coupled thereto via the tip and ring voltage dividers 14 and 15 to control operation of the tip and ring voltage amplifiers 20 and 40. The tip and ring voltage amplifiers 20 and 40 are thus caused to insert voltage drops in series with the voltage drops occurring across the tip and ring feed resistors 12 and 13. Thus the output resistance of each of the voltage sources 20 and 40 is raised with respect to low values they would have in the absence of control signals from the control circuit 60, such that the series feed resistance of the line circuit is adjusted to suit a wide range of the transmission line resistances. The controller also performs functions of providing ON HOOK, OFF HOOK, and dial pulsing indications on the supervision lead.

Alternating current voice band signals intended to be received by the telephone set in the OFF HOOK condition are applied at the receive lead. These signals are propagated along the transmission line under the control of the control circuit 60 which causes the effective output resistances of the tip and ring voltage amplifiers 20 and 40 to be correspondingly varied, and these operate a voice receiver in the OFF HOOK telephone set. Alternating current signals being propagated from a transmitter in the OFF HOOK telephone set are received via the transmission line and the tip and ring voltage taps 6 and 7. Both the transmitter propagated a.c. signals, and the receiver destined a.c. signals, modulate the energizing current flows in the respective tip and ring feed resistors 12 and 13, and cause corresponding differential a.c. voltage signal components to appear at the tip and ring voltage taps 6 and 7. The control circuit 60 responds to the differential a.c. voltage signal components by generating similar a.c. signals on the transmit lead. Separation of the transmitter propagated a.c. signal component from the receiver destined a.c. signal component for transmission through the associated telephone facility may be achieved by various well known hybrid circuits designed for this purpose.

In a typical operating environment there is usually a risk that at some time an exceptionally high voltage will be coupled to the transmission line and the circuit, as for example in an event of a lightening strike or an accidental power line cross. In order to provide suitable protection for the voltage amplifiers 20 and 40, it is preferable that protection networks be connected at the line terminals 2 and 3, or at the feed terminals 4 and 5, to provide an alternate route for currents associated with such high voltages. Various suitable protection networks are well known and may include a diode bridge arrangement. In the case where a protection network is used at the feed terminals 4 and 5, it may also be preferable that the tip and ring feed resistor be of sufficient bulk to be able to withstand the severe power dissipation often associated with a high voltage occurrence, without sustaining significant damage.

Figure 2:
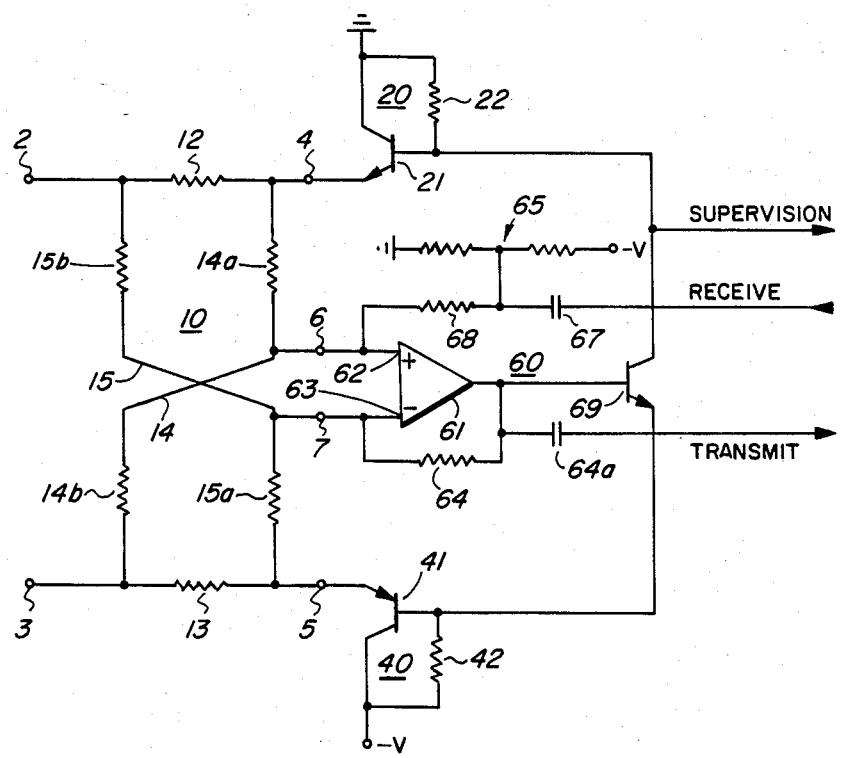
FIG. 2 is a schematic diagram of a line circuit in accordance with the line circuit illustrated in FIG. 1.

A more detailed illustration of one example of the line circuit in FIG. 1 is given in FIG. 2. In FIG. 2, the control circuit 60 includes a differential amplifier 61 having inverting and non-inverting inputs 63 and 62 connected to the ring and tip voltage taps 7 and 6 respectively. A resistor 64 is connected in series with a capacitor 64a between the inverting input 63 and the transmit lead. A junction of the resistor 64 and the capacitor 64a is connected to an output of the amplifier 61 and a base of a transistor 69. A capacitor 67 and a resistor 68 are connected in series between the receive lead and the non-inverting input 62. A voltage tap of a voltage divider 65 is connected to the junction of the resistor 68 and the capacitor 67, to supply a bias voltage at the non-inverting input 62 of the amplifier 61. The tip voltage amplifier 20 consists of an NPN transistor 21 connected in an emitter follower configuration. The transistor 21 includes a base connected to a collector of the transistor 69, a collector connected to ground, and an emitter connected to the tip feed terminal 4. A resistor 22 is connected between ground and the base of the transistor 21. The ring voltage amplifier 40 consists of a PNP transistor 41 connected in an emitter follower configuration. The transistor 41 includes a base connected to an emitter of the transistor 69, a collector connected to a power source $-V$, and an emitter connected to the ring feed terminal 5. A resistor 42 is connected between the power source $-V$ and the base of transistor 41.

In operation during the OFF HOOK condition the differential amplifier 61 generates an output voltage which becomes stable when currents traversing the network 10 in combination with feedback through the resistor 64 result in a potential at the ring voltage tap 7 which is substantially equal to a potential at the tip voltage tap 6. This potential at the tip voltage tap results from the traversing currents in combination with bias being coupled from the voltage divider 65 via the resistor 68. The output voltage from the differential amplifier 61 is followed directly, less two base emitter forward voltage drops, at the ring feed terminal 5. The voltage at the tip feed terminal follows the voltage at the output of the differential amplifier 61 inversely, being displaced therefrom by the instant potential being developed across the transistor 69.

During the ON HOOK condition, the output of the differential amplifier approaches the potential of $-V$. The transistor 69 is thus essentially OFF and the transistors 21 and 41 are essentially saturated ON. In this case the potential at the supervision lead is near ground. In contrast, during the OFF HOOK condition energizing current flow is throttled by the tip and ring voltage amplifiers 20 and 40 in combination with the tip and ring feed resistances 12 and 13. The resultant source impedance feeding the transmission line is substantially determined as a function of the value of the resistor 64 and is the same for both a.c. and d.c. signals. Alternating current signals are received on the receive lead via the capacitor 67 and cause a corresponding alternating component to be propagated toward the telephone station set, not shown, through the complementary response of the transistors 21 and 41 in combination with the transistor 69.

Figure 3:
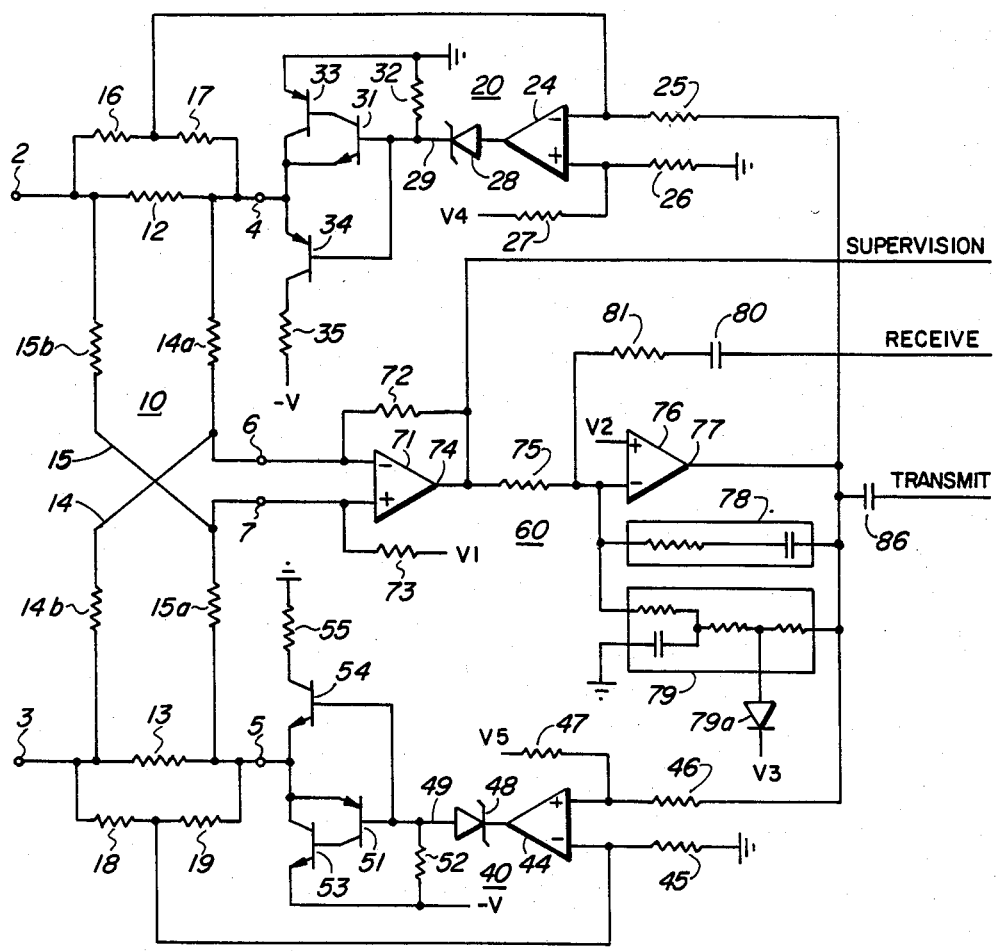
FIG. 3 is a schematic diagram of another line circuit in accordance with the line circuit illustrated in FIG. 1.

Referring to FIG. 3, the illustrated line circuit provides operational improvements in contrast to the line circuit in FIG. 2. Briefly some of these improvements include improved common mode rejection, individually determined a.c. termination impedance and d.c. feed resistance, current limiting for very short subscriber loop circuits and bidirectionally conductive voltage amplifiers. The resistance network 10 is the same as that illustrated in FIGS. 1 and 2 except for the addition of a tip feedback network which includes resistors 16 and 17 connected in series across the resistor 12, and a ring feedback network which includes resistors 18 and 19 connected in series across the resistor 13. The function of the resistors 16 and 17, and of the resistors 18 and 19, is that of providing feedback signals to the tip and ring voltage amplifiers at 20 and 40 respectively. In this structure a preferred level of common mode rejection performance of the control circuit 60 is relaxed to a performance level common to many inexpensive differential amplifier circuit types.

Considering FIG. 3 in more detail, circuit elements 24 through 35, connected as shown at 20, correspond to the tip voltage amplifier 20 in FIG. 1, and circuit elements 44 through 55, connected as shown at 40, correspond to the ring voltage amplifier 40 in FIG. 1. Bias potentials V1–V5 are listed in table A and are provided by any of various means, for example voltage divider networks, which for simplicity of illustration are not shown.

TABLE A

| V1 | .379 of −V |
|---|---|
| V2 | .475 of −V |
| V3 | .570 of −V |
| V4 | .379 of −V |
| V5 | .240 of −V |

The bias potentials are expressed as a decimal fraction of the potential of the power source −V. In operation, a differential amplifier 24 is inversely responsive to an input signal received via a resistor 25 and which is more negative than a bias potential at a junction of resistors 26 and 27. An output signal from the differential amplifier 24 is level shifted via a Zener diode 28 and controls a voltage source including transistors 31 and 33, and a resistor 32. In the event a longitudinally induced current at the terminal 2 becoming of sufficient opposing magnitude with respect to the d.c. energizing current flow to momentarily reverse the energizing current flow, a transistor 34 and a resistor 35 provide a current path to the power source −V. The ring voltage amplifier at 40 is of similar structure and operates in the same manner. The Zener diodes 28 and 48 are suitably provided by 10 to 15 volt devices. The level shifting function thus provided, although not essential for the line circuit does permit the use of lower voltage and hence less costly differential amplifiers than would otherwise be the case.

Circuit elements 71 through 79a, connected as shown at 60, correspond to the control circuit 60 in FIG. 1. A differential amplifier 71 is responsive to potential differences appearing across the tip and ring voltage taps 6 and 7 with an amount of gain as determined by the ohmic value of a resistor 72, and with an offset as introduced via a resistor 73 connected between a non inverting input of the differential amplifier and V1. The offset causes the line circuit to conduct energizing current. An output 74 of the differential amplifier 71 is connected to the supervision lead and via a resistor 75 to an inverting input of a differential amplifier 76. Signals on the receive lead are a.c. coupled via a capacitor 80 and a resistor 81 to the inverting input. An output 77 of the differential amplifier 76 is coupled to the transmit lead by a capacitor 86 and provides both the received and transmitted a.c. signals as well as a d.c. control signal for controlling the operation of both the tip and ring voltage amplifiers at 20 and 40. An a.c. feedback network 78 determines the a.c. response characteristics of the differential amplifier 76 and hence the effective a.c. terminating impendance across the terminals 2 and 3. A d.c. feedback network 79 determines the d.c. response characteristic of the amplifier 76 and hence the effective d.c. feed resistance across the terminals 2 and 3. A diode 79a, connected to the d.c. feedback network 79 causes a current limiting feed to occur on very short subscriber loops to reduce the normal operating power consumption.

In an alternate arrangement of the line circuit in FIG. 3, a single differential amplifier is used to provide the functions of the control circuit 60. In this arrangement, which is not shown, the functions of the networks 78 and 79 are provided by additional components directly associated with the differential amplifier 71, and the differential amplifier 76 is no longer required. Other variations of the line circuits in the drawings and which are within the scope of the invention will become apparent to persons skilled in this art.

Figure 4:
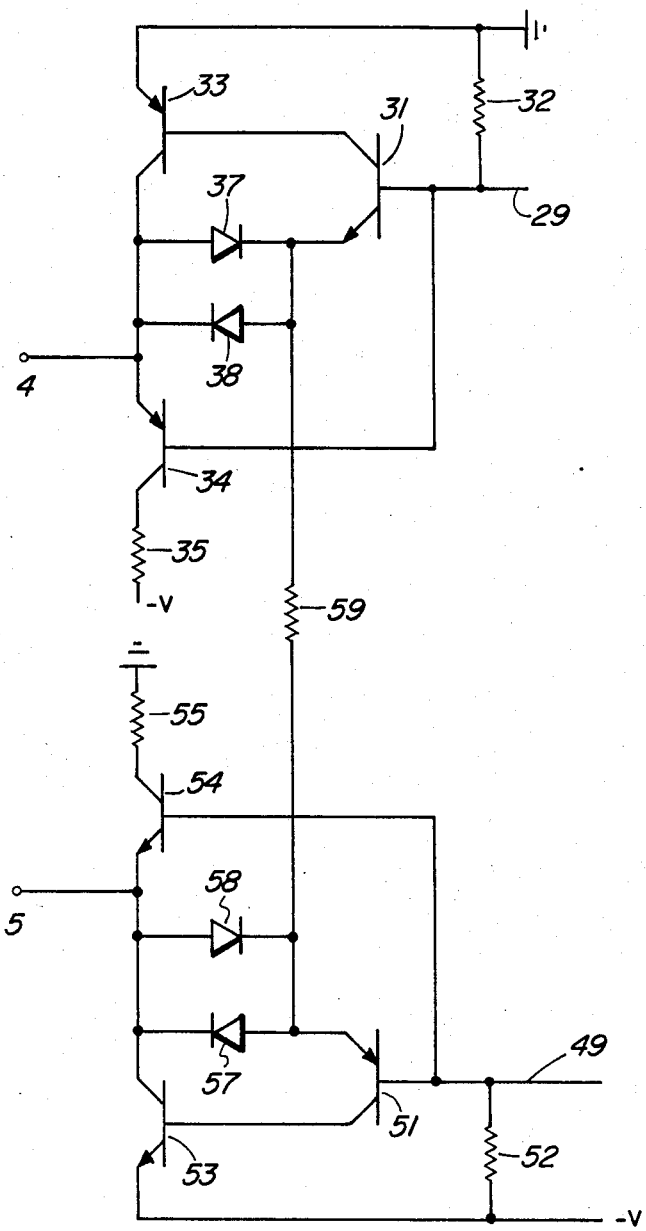
FIG. 4 is a schematic diagram of a modification of the line circuit illustrated in FIG. 3.

The circuit in FIG. 4 illustrates voltage source portions of the tip and ring voltage amplifiers 20 and 40, with circuit modifications to permit operation of the voltage amplifiers with less voltage drop with respect to ground and the −V supply potential while avoiding a saturation condition. This is done by provision of an additional current path in combination with the resistors 32 and 52 via diodes 37 and 57 and a resistor 59. Diodes 38 and 58 are included to permit operation at high line currents, for example when the currents required to be conducted at the emitters of the transistors 31 and 51 exceed the current which can be supplied by the resistor 59 being of a preferred ohmic value.

In practice the line circuits as illustrated in FIGS. 3 or 4 are suitable for operation from a typical telephone office central battery having a potential in a range of from −45 to −55 volts, but are not limited to this range.

What is claimed is:

1. A line circuit for supplying energizing direct current to a pair of leads in a communication line, comprising:
    a pair of line terminals for connection to the communication line;
    first and second voltage amplifiers having first and second output terminals respectively;
    a resistance network including, first and second feed resistors for connection in series between the respective first and second output terminals and respective ones of the pair of line terminals, the first and second resistors being of similar ohmic values, a first voltage divider being connected between the first output terminal and an end of the second feed resistor remote from the second output terminal and including a first voltage tap, and a second voltage divider being connected between the second output terminal and an end of the first feed resistor remote from the first output termial and including a second voltage tap;
    a control circuit for causing the first and second voltage amplifiers to provide energizing direct current for the communication line via the first and second feed resistors in accordance with potentials appearing at the first and second voltage taps; and
    wherein the resistance network further comprises:
        a first network connected across the first feed resistor for providing a negative feedback signal to the first voltage amplifier;
        a second network, similar to the first network, connected across the second feed resistor for providing a negative feedback signal to the second voltage amplifier;
        whereby common mode rejection of longitudinally induced a.c. signals on the communication line is enchanced.

2. A line circuit as defined in claim 1 wherein the control circuit comprises:

differential amplification means having inverting and non-inverting inputs, an output, a feedback path including a resistor connected between the output and the inverting input, and a d.c. bias means, the differential amplification means being connected to be responsive to potentials appearing via the first and second voltage taps, and the bias means, whereby an effective impedance at the pair of line terminals is a function of resistance values of the resistance network and an impedance of the feedback path.

3. A line circuit for supplying energizing direct current to a pair of leads in a communication line, comprising:

a pair of line terminals for connection to the communication line;

first and second voltage amplifiers having first and second output terminals respectively;

a resistance network including, first and second feed resistors for connection in series between the respective first and second output terminals and respective ones of the pair of line terminals, the first and second resistors being of similar ohmic values, a first voltage divider being connected between the first output terminal and an end of the second feed resistor remote from the second output terminal and including a first voltage tap, and a second voltage divider being connected between the second output terminal and an end of the first feed resistor remote from the first output terminal and including a second voltage tap;

a control circuit for causing the first and second voltage amplifiers to provide energizing direct current for the communication line via the first and second feed resistors in accordance with potentials appearing at the first and second voltage taps, wherein the control circuit comprises:

differential amplification means having inputs connected to the first and second voltage taps, at least one differential amplifier circuit including an a.c. feedback network and a d.c. feedback network, whereby an effective voice band a.c. impedance at the pair of line terminals is a function of resistance values of the resistance network and an impedance of the a.c. feedback network and an effective d.c. feed resistance at the pair of line terminals is a function of said resistance values and a resistance value of the d.c. feedback network.

4. A line circuit as defined in claim 1 wherein the control circuit comprises:

differential amplification means having inputs connected to the first and second voltage taps, at least one differential amplifier circuit including an a.c. feedback network and a d.c. feedback network, whereby an effective voice band a.c. impedance at the pair of line terminals is a function of resistance values of the resistance network and an impedance of the a.c. feedback network and an effective d.c. feed resistance at the pair of line terminals is a function of said resistance values and a resistance value of the d.c. feedback network.

5. A line circuit as defined in claim 3 wherein the d.c. feedback network includes a non-linear element having a predetermined threshold of conduction, whereby the control circuit causes the first and second voltage amplifiers to further limit the energizing direct current at the pair of line terminals.

6. A line circuit as defined in claim 4 wherein the d.c. feedback network includes a non-linear element having a predetermined threshold of conduction, whereby the control circuit causes the first and second voltage amplifiers to further limit the energizing direct current at the pair of line terminals.

7. A line circuit as defined in any of the claims 1 and 2 through 6, wherein the first and second feed resistors are of ohmic values corresponding to within one half of one percent and in summation are at most one half of the preferred d.c. feed resistance for a subscriber loop communication line, and wherein the first and second voltage dividers consist of four resistors having ohmic values such that in operation of the communication line being remotely connected with a station set in an OFF HOOK condition, the voltage dividers conduct a current of less than one percent of the current flow in the first and second feed resistors, said ohmic values of the four resistors corresponding to within one half of one percent of each other.

* * * * *